(12) United States Patent
Yamamoto et al.

(10) Patent No.: US 10,954,947 B2
(45) Date of Patent: Mar. 23, 2021

(54) BACKPACK-TYPE BLOWER (71) Applicant: MAKITA CORPORATION, Anjo (JP)

(72) Inventors: Hirokatsu Yamamoto, Anjo (JP); Yuki Kawai, Anjo (JP); Makoto Takahashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 459 days.

(21) Appl. No.: 15/568,062

(22) PCT Filed: Apr. 19, 2016

(86) PCT No.: PCT/JP2016/062394
§ 371 (c)(1),
(2) Date: Oct. 20, 2017

(87) PCT Pub. No.: WO2016/171136
PCT Pub. Date: Oct. 27, 2016

(65) Prior Publication Data
US 2018/0080453 A1 Mar. 22, 2018

(30) Foreign Application Priority Data
Apr. 20, 2015 (JP) .............................. JP2015-085922

(51) Int. Cl.
*H02P 6/06* (2006.01)
*H02P 5/46* (2006.01)
(Continued)

(52) U.S. Cl.
CPC ................ *F04D 25/08* (2013.01); *B08B 5/02* (2013.01); *F04D 25/0673* (2013.01);
(Continued)

(58) Field of Classification Search
CPC .... B08B 5/02; A47L 11/4005; A47L 11/4011; H02P 5/46; H02P 6/18; H02P 2006/045; H02P 5/74; H02K 11/25
(Continued)

(56) References Cited

U.S. PATENT DOCUMENTS 6,006,400 A   12/1999   Presenza
6,109,865 A    8/2000   Ishikawa
(Continued)

FOREIGN PATENT DOCUMENTS

CN   101149057 A  *  3/2008
CN   101149057 A     3/2008
(Continued)

OTHER PUBLICATIONS

Foreign translation (Year: 2008).*
(Continued)

*Primary Examiner* — Bryan R Muller
*Assistant Examiner* — Abbie E Quann
(74) *Attorney, Agent, or Firm* — Oliff PLC (57) ABSTRACT A backpack-type blower according to one aspect of the present disclosure includes a plurality of fans, a plurality of DC power supplies and a backpack. The plurality of fans and the plurality of DC power supplies are mounted on the backpack. The backpack-type blower is configured to blow winds from the plurality of fans together.

19 Claims, 7 Drawing Sheets

(51) Int. Cl.
*B08B 5/02* (2006.01)
*H02P 5/74* (2006.01)
*F04D 25/08* (2006.01)
*H02P 6/18* (2016.01)
*F04D 25/06* (2006.01)
*F04D 27/00* (2006.01)
*H02P 6/04* (2016.01)

(52) U.S. Cl.
CPC ............. *F04D 27/008* (2013.01); *H02P 5/46* (2013.01); *H02P 5/74* (2013.01); *H02P 6/06* (2013.01); *H02P 6/18* (2013.01); *H02P 2006/045* (2013.01)

(58) Field of Classification Search
USPC .......................... 15/405; 310/47, 50, 63, 114
See application file for complete search history.

(56) References Cited

U.S. PATENT DOCUMENTS

| | | | |
|---|---|---|---|
| 6,305,048 | B1 | 10/2001 | Salisian |
| 7,466,053 | B1* | 12/2008 | Radev ...................... H02K 1/32 310/114 |
| 8,773,048 | B2* | 7/2014 | Sato ...................... F04D 25/166 318/67 |
| 8,984,711 | B2* | 3/2015 | Ota ......................... H01M 2/34 15/339 |
| 9,179,811 | B2* | 11/2015 | Fukunaga ................. A47L 5/14 |
| 9,192,222 | B2* | 11/2015 | Nashimoto ............ A01G 20/43 |
| 2003/0034699 | A1* | 2/2003 | Selewski .............. H02K 19/103 310/50 |
| 2003/0167594 | A1 | 9/2003 | Iida et al. |
| 2005/0115256 | A1* | 6/2005 | Okano .................. F04D 27/004 62/183 |
| 2008/0297079 | A1* | 12/2008 | Kanamori ................ H02P 6/18 318/400.06 |
| 2009/0102412 | A1* | 4/2009 | Hwang .................... H02P 1/30 318/707 |

FOREIGN PATENT DOCUMENTS

| | | |
|---|---|---|
| JP | H11-148119 A | 6/1999 |
| JP | 2003-253638 A | 9/2003 |
| JP | 2013-185737 A | 9/2013 |
| JP | 2014-137030 A | 7/2014 |
| JP | 2014-148951 A | 8/2014 |
| JP | 2014-173514 A | 9/2014 |

OTHER PUBLICATIONS

Jul. 31, 2018 Office Action issued in Japanese Patent Application No. 2015-085922.
Jul. 26, 2016 Search Report issued in International Patent Application No. PCT/JP2016/062394.
Jul. 26, 2016 Written Opinion issued in International Patent Application No. PCT/JP2016/062394.
Dec. 19, 2018 Office Action issued in Chinese Patent Application No. 201680023099.4.

* cited by examiner

BACKPACK-TYPE BLOWER

CROSS-REFERENCE TO RELATED APPLICATION

The present international application claims the benefit of Japanese Patent Application No. 2015-085922 filed on Apr. 20, 2015 with the Japanese Patent Office, and the entire disclosure of Japanese Patent Application No. 2015-085922 is incorporated herein by reference.

TECHNICAL FIELD

The present disclosure relates to a backpack-type blower that is supplied with electric power from a battery to operate.

BACKGROUND ART

Conventionally, a backpack-type blower is known in which a fan that is rotationally driven by a motor and a battery that supplies electric power to the fan are mounted on a backpack and a user may carry the backpack-type blower on the back by means of the backpack to use (refer to, for example, Patent Document 1).

PRIOR ART DOCUMENTS

Patent Documents

Patent Document 1: US6006400

SUMMARY OF THE INVENTION

Problems to be Solved by the Invention

In the above-described conventional backpack-type blower, a pair of the motor and fan is mounted on the backpack, and accordingly, air blowing capability from the blower is determined by a size of the fan and a rotational speed of the motor.

Therefore, in order to increase the blowing capability, it is necessary to make the fan larger or increase the rotational speed of the motor. However, if the blowing capability is increased by such a method, there is a problem that not only the blower becomes larger but also noise generated during operation becomes large, so that usage is inconvenient.

According to one aspect of the present disclosure, it is preferable to increase the air blowing capability while inhibiting the noise generated during operation in the backpack-type blower.

Means for Solving the Problems

A backpack-type blower according to one aspect of the present disclosure includes a plurality of fans each including a corresponding motor and a plurality of DC power supplies for supplying electric power to each fan and is configured to blow winds from the plurality of fans together.

Therefore, it is possible to increase air blowing capability from the blower without increasing a rotational speed of each fan (in other words, a rotational speed of the motor) by the plurality of fans, and eventually, the generation of noise can be inhibited.

Since electric power is supplied from each of a plurality of DC power supplies to each fan, usable time (so-called run time) from a fully charged state of the battery can be lengthened as compared to a case where electric power is supplied from one battery to each fan (motor).

Therefore, the backpack-type blower of the present disclosure can improve usability as compared with the conventional one.

Herein, each of the plurality of DC power supplies may also be configured to supply electric power to a corresponding fan via an independent power supply path.

In this manner, it is possible to inhibit current from flowing between the DC power supplies via the power supply path to the fan when output voltages vary among the plurality of DC power supplies.

Furthermore, for example, even if one of the plurality of fans is put into an abnormal state such as high temperature and the driving of the fan is stopped, the other fan(s) can be normally driven and it is possible to inhibit breakdown of the same as the blower.

Negative electrodes of the plurality of DC power supplies may also be configured to have the same electric potential.

In this manner, reference potential of various circuits used for connecting or blocking the power supply path from the DC power supply to the corresponding fan (motor) and for controlling motor current flowing through the path can be made the same, so that a circuit configuration may be simplified.

Each DC power supply may also be formed of a plurality of batteries.

In this case, it is better to couple the plurality of batteries in series rather than in parallel.

That is, if the plurality of batteries is coupled in series, drive voltage supplied from the DC power supply to the fan (motor) is raised, so that it is possible to inhibit the current flowing through the power supply path to decrease power loss occurring in the power supply path.

The backpack-type blower according to one aspect of the present disclosure may be provided with a controller that monitors states of a plurality of DC power supplies or a plurality of fans and, when detecting abnormality that rotation of at least one of the plurality of fans cannot be continued, stops the rotation of the at least one fan.

In this manner, it is possible to stop the rotation of the motor when at least one fan cannot be normally driven due to lowering of a remaining power amount accumulated in the DC power supply (hereinafter also simply referred to as "remaining capacity") or failure of at least one fan (motor). If the rotation of the motor is stopped in this manner, it is possible to inhibit overdischarging of the battery forming the DC power supply or burnout of the motor due to overcurrent flowing through the motor.

The controller may also be configured to increase a rotational speed of the other fan(s) when the rotation of the at least one fan in which the abnormality is detected is stopped. In this manner, it is possible to inhibit an air blowing amount from the backpack-type blower from lowering.

In this case, the controller may also be configured to control the rotational speed of the other fan(s) so that the blowing amount from the backpack-type blower is the same as that before the rotation of the at least one fan in which the abnormality is detected is stopped.

The controller may also be configured to control the electric power supplied from each DC power supply to each fan according to the remaining capacity indicating the remaining amount of electric power accumulated in each DC power supply.

In this manner, for example, in a case where two DC power supplies and two fans are mounted on the backpack-type blower and a ratio of the remaining capacities of the two DC power supplies is 1:2, it is possible to control such that the ratio of the electric power supplied to the two fans supplied with the electric power from each DC power supply is also 1:2. Therefore, in this case, it is possible to efficiently use the electric power of each DC power supply.

Next, as the motor provided in each of the plurality of fans, it is preferable to use a brushless motor excellent in durability that can be efficiently driven.

In order to drive the brushless motor, it is necessary to detect a rotational position of the motor. However, if a sensor is used for this detection, the number of wires coupled to the fan increases.

Therefore, when the brushless motor is provided for each fan, a sensorless motor not provided with a sensor for detecting the rotational position may also be used. In this case, the rotational position may be detected by a conventionally known sensorless method such as a method of detecting induced voltage generated by the rotation of the motor.

It is preferable that the motor provided in each fan is controlled to constantly rotate by a driving unit. In this manner, the motor (eventually the fan) can be rotated at a constant speed, and air can be stably blown from the blower.

In order to stabilize the air blowing amount from the blower in this manner, it is preferable to form the motor provided in each fan as an outer rotor motor. Since the outer rotor motor has larger moment of inertia than that of an inner rotor motor and the rotation of the rotor is stable, it is possible to stably rotate the fan at a constant speed.

EXPLANATION OF REFERENCE NUMERALS

2 . . . blower, 4 . . . backpack, 6 . . . blower main body, 7 . . . pipe attaching unit, 8, 8*a* to 8*e* . . . pipe, 9 . . . blowing port, 10A, 10B . . . fan, 12A, 12B . . . motor, 20 . . . handle unit, 22 . . . trigger SW, 22*a* . . . main SW, 22*b* . . . variable resistance portion, 24 . . . dial SW, 26 . . . lock button, 28 . . . main power supply SW, 30 . . . display unit, DA, DB . . . light emitting diode, 32, 42A, 42B . . . cable, 34, 44A, 44B . . . connector, 40 . . . centralized management controller, 50A, 50B . . . DC power supply, 50A1, 50A2, 50B1, 50B2 . . . battery pack, 52A, 52B . . . remaining capacity display unit, 60A, 60B . . . driving controller, 62 . . . inverter circuit, 64 . . . rotational position sensor, 66, 68 . . . temperature sensor, 70 . . . control circuit, 72 . . . rotor position detection unit, 74 . . . rotor rotational speed calculation unit, 76 . . . PWM generation unit, 78 . . . switching control unit, 80 . . . state monitoring unit, 82, 84 . . . battery state detection unit

Mode for Carrying Out the Invention

An embodiment of the present disclosure is hereinafter described with reference to the drawings.

Figure 1:
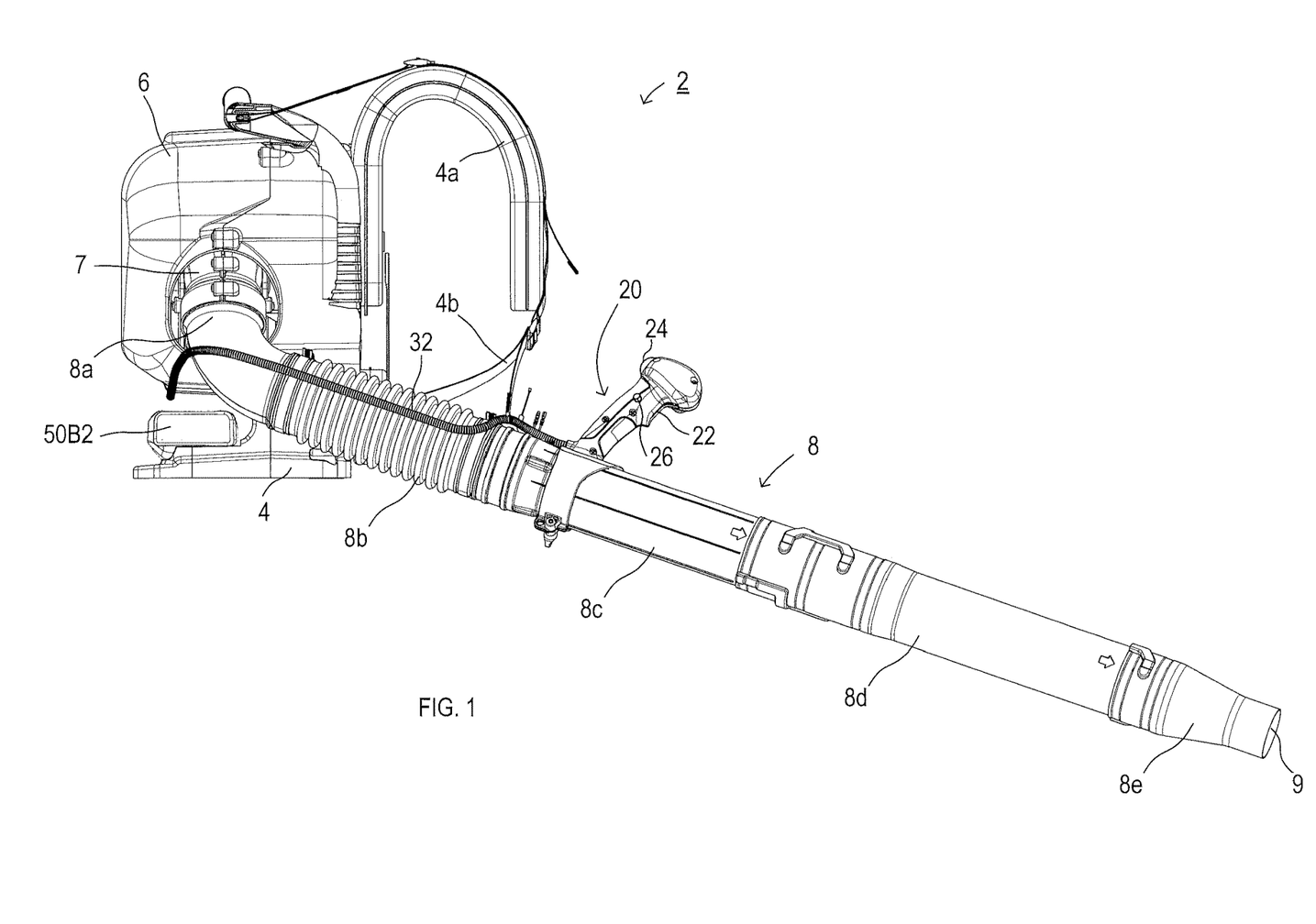
FIG. 1 is a configuration diagram illustrating a configuration of an entire backpack-type blower according to an embodiment.

As illustrated in FIG. 1, a backpack-type blower (hereinafter also simply referred to as a blower) 2 of this embodiment is provided with a blower main body 6 mounted on a backpack 4, and a pipe 8 for guiding air blown from the blower main body 6 to a blowing port 9 at a tip end thereof and blowing the air from the blowing port 9.

Figure 2:
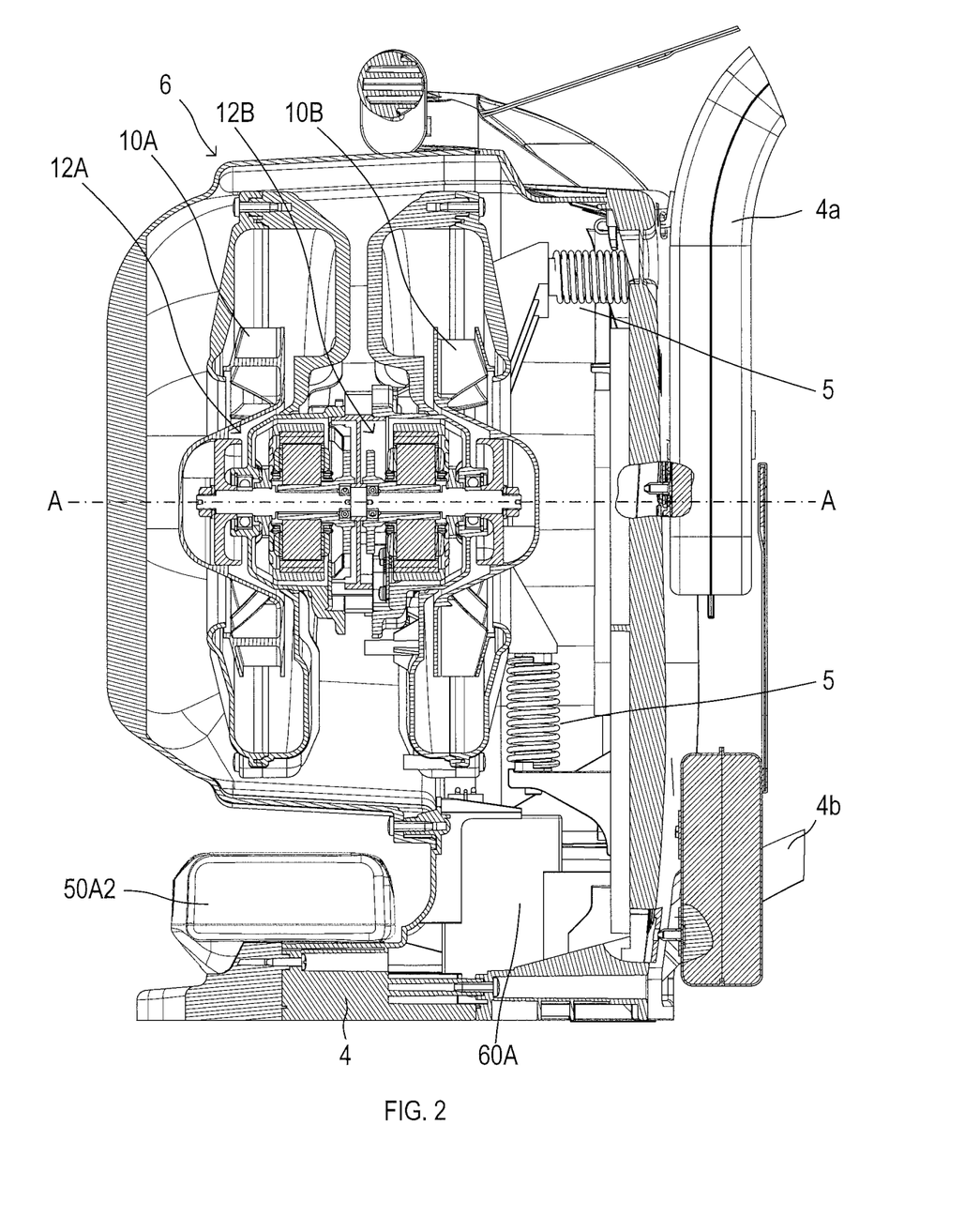
FIG. 2 is a cross-sectional view of a blower main body as seen in the same direction as FIG. 1.

As illustrated in FIG. 2, fans 10A and 10B which rotate around a common central axis A to introduce air from both end sides of the central axis A and send the air in the same direction are accommodated in the blower main body 6.

Figure 3:
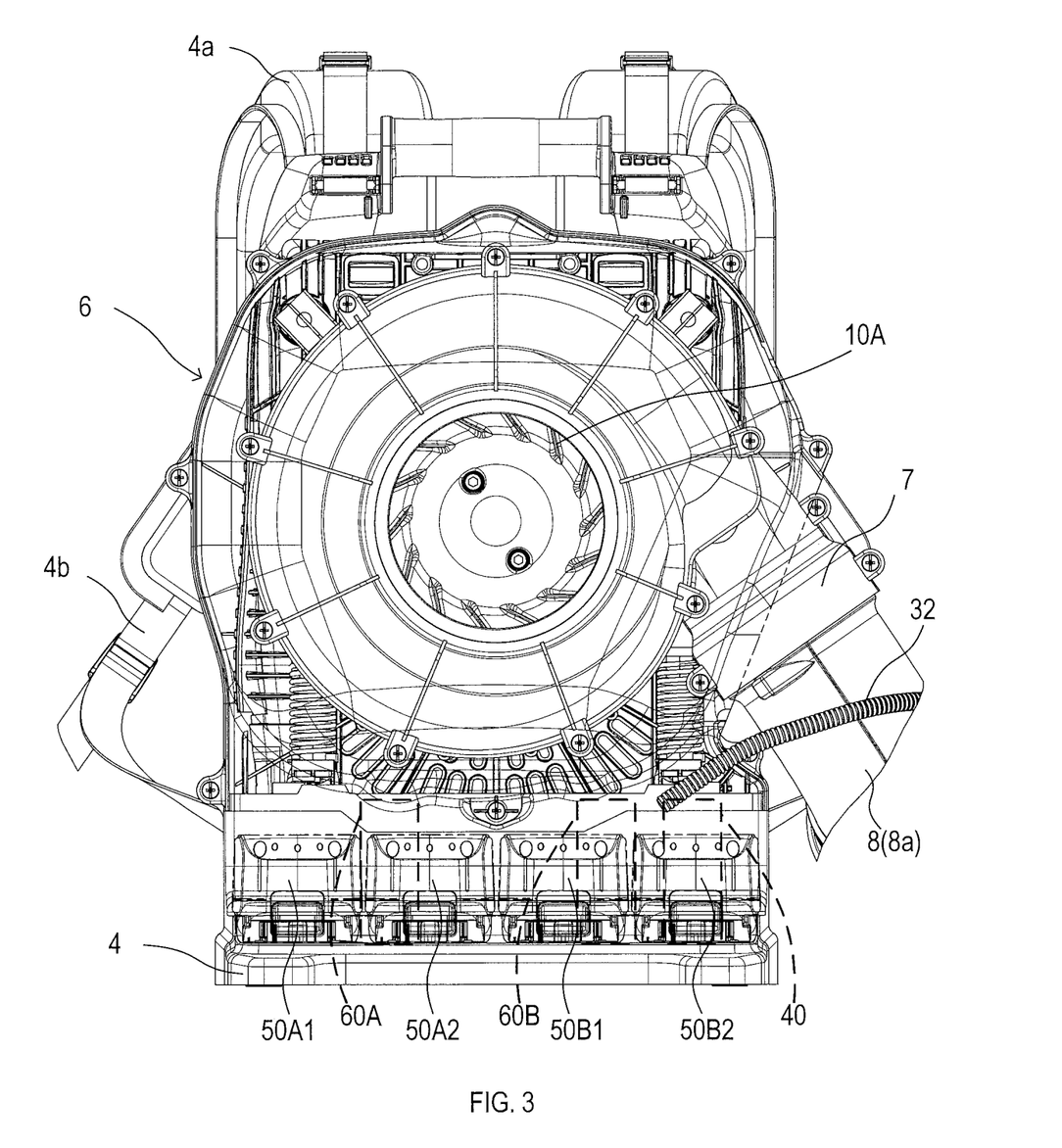
FIG. 3 is an illustrative view of an interior of the blower main body as seen from the left of FIG. 2.

The blower main body 6 is provided with a pipe attaching unit 7 for collecting winds from the fans 10A and 10B and blowing the winds to the pipe 8 (refer to FIG. 3).

The fans 10A and 10B are provided with outer rotor-type brushless motors (hereinafter simply referred to as motors) 12A and 12B, respectively, and fixed to rotors of the motors 12A and 12B, respectively.

The motors 12A and 12B having the same structure are arranged to face in opposite directions on the central axis A such that outside air can be introduced from the both end sides of the central axis A by the rotation of the fans 10A and 10B. The motors 12A and 12B rotate in the same direction around the central axis A by being driven so that rotational directions thereof are opposite to each other.

The fans 10A and 10B take in the outside air from the both end sides of the central axis A by the rotation of the motors 12A and 12B in the same direction around the central axis A, and blow the taken-in air from the pipe attaching unit 7 in the same direction.

The blower main body 6 is fixed to the backpack 4 via a spring 5 for absorbing vibration, and the backpack 4 is provided with a shoulder pad 4*a* and a belt 4*b* for a user to put the same on the shoulder.

In the blower main body 6, the pipe attaching unit 7 is provided so as to be located on a right side of the user when the user carries the blower main body 6 on the back via the backpack 4.

Next, the pipe 8 is formed of pipes 8*a* to 8*e* obtained by dividing the pipe 8 into five pipes along a central axis thereof.

Among them, the pipe 8*a* can be detachably mounted on the pipe attaching unit 7 and is formed into an L shape such that a blowing direction of air from the blower main body 6 can be changed from a lateral direction of the user to a forward direction thereof.

The pipe 8*b* connected to the pipe 8*a* is formed into a bellows shape such that a direction of the blowing port 9 can be appropriately changed.

The pipe 8*c* connected to the pipe 8*b* is a straight pipe, and a handle unit 20 is provided on an outer periphery of the pipe 8*c* such that the user can grip the handle unit 20 to adjust the direction of the blowing port 9. Moreover, the handle unit 20 is slidable in a direction of a central axis of the pipe 8*c* and can be fixed at an appropriate position to be used.

The pipe 8*c* can be connected to either the straight pipe 8*d* or the pipe 8*e* whose tip end is formed to have a small diameter as the blowing port 9. When the pipe 8*d* is connected to the pipe 8*c*, the pipe 8*e* can be connected to a tip end of the pipe 8*d*.

Next, the handle unit 20 is provided with various operation switches so as to be operated by a finger when the user grips the handle unit 20.

That is, the handle unit 20 is provided with a trigger switch (switch is hereinafter referred to as SW) 22 for adjusting a blowing amount of air from the blower 2 and a dial SW 24 for setting a maximum blowing amount adjustable by operation of the trigger SW 22. The handle unit 20 is also provided with a lock button 26 for holding the trigger SW 22 at a maximum operation position, and a main power supply SW 28 and a display unit 30 for displaying an operation state illustrated in FIG. 4.

Figure 4:
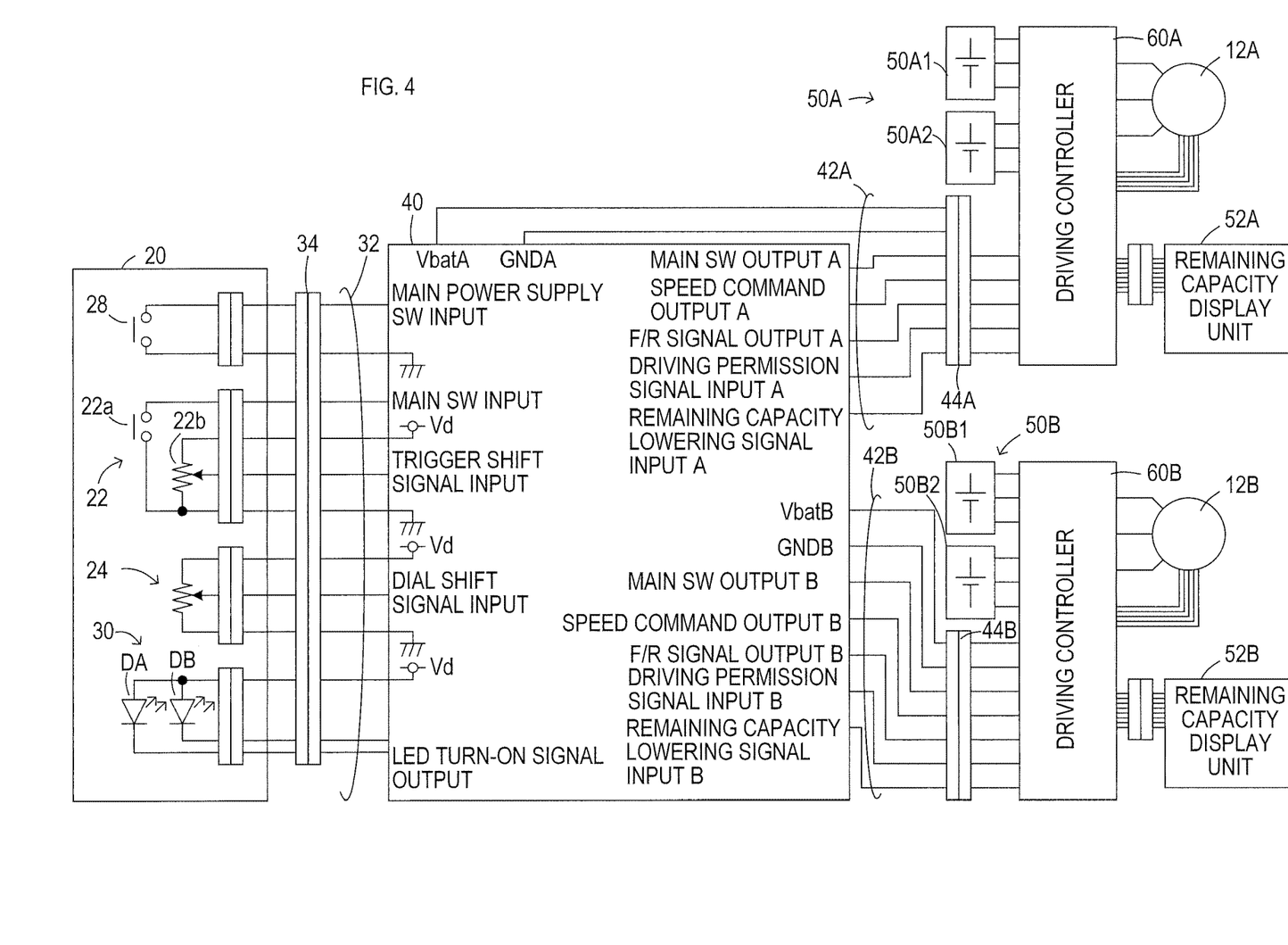
FIG. 4 is a block diagram illustrating a circuit configuration of the backpack-type blower according to the embodiment.

As illustrated in FIG. 4, the trigger SW 22, the dial SW 24, the main power supply SW 28, and the display unit 30 are coupled to a centralized management controller 40 fixed to the backpack 4 together with the blower main body 6 via a cable 32 and a connector 34.

The centralized management controller 40 is formed of a well-known microcomputer including a CPU, a ROM, a RAM, an input/output port and the like.

The trigger SW 22 is also provided with a main SW 22*a* that is turned on when operated by the user and a variable resistance portion 22*b* whose resistance value changes according to an amount of the operation by the user.

The centralized management controller 40 applies power supply voltage Vd to the variable resistance portion 22*b* and takes in divided voltage by sliding contact of the variable resistance portion 22*b* as a trigger shift command.

The dial SW 24 is formed of variable resistor whose resistance value varies according to a rotational position of the dial.

The centralized management controller 40 applies the power supply voltage Vd to the variable resistor and takes in the divided voltage by the sliding contact of the variable resistor as a dial shift command.

Also, when the main SW 22*a* of the trigger SW 22 is turned on, the centralized management controller 40 sets rotational speeds of the fans 10A and 10B (in other words, the motors 12A and 12B).

Specifically, the rotational speed is set by multiplying a ratio corresponding to the trigger shift command (that is, divided voltage) taken in from the variable resistance portion 22*b* of the trigger SW 22 by the rotational speed corresponding to the dial shift command taken in from the dial SW 24 as a maximum rotational speed.

The main power supply SW 28 is a momentary SW (normally off). When the main power supply SW 28 is turned on by the operation by the user, an internal power supply circuit thereof is turned on/off (in other words, the same is operated/stopped).

When the various SWs 22, 24, and 28 are not operated for a certain period of time, the centralized management controller 40 automatically turns off the internal power supply circuit.

The display unit 30 is provided with light emitting diodes (LEDs) DA and DB which are turned on by energization from the centralized management controller 40 when the centralized management controller 40 can drive the fans 10A and 10B respectively.

Next, DC power supplies 50A and 50B used for driving the motors 12A and 12B, respectively, are formed of two battery packs 50A1 and 50A2, and 50B1 and 50B2, respectively, illustrated in FIG. 3 and FIG. 4.

Figure 5:
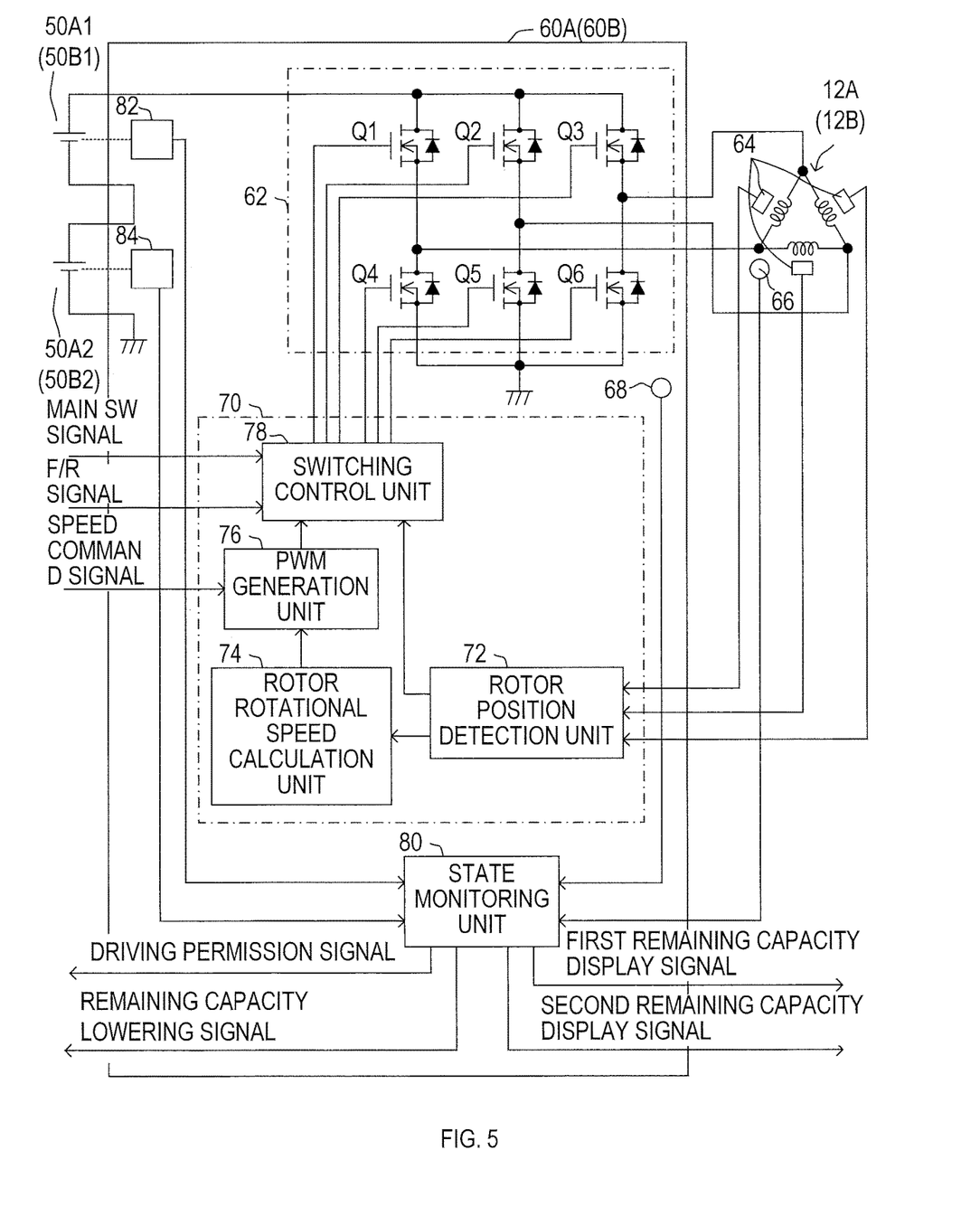
FIG. 5 is a block diagram illustrating a circuit configuration of a driving controller.

The two battery packs 50A1 and 50A2, and 50B1 and 50B2 are coupled to the controllers 60A and 60B for driving the motors 12A and 12B, respectively, and are coupled in series inside each of the driving controllers 60A and 60B (refer to FIG. 5).

As illustrated in FIG. 3, the battery packs 50A1, 50A2, 50B1, and 50B2 are arranged in this order from a left side to a right side below the blower main body 6 when the blower main body 6 is seen from behind the backpack 4.

As illustrated in FIG. 2, the driving controllers 60A and 60B (60A is illustrated in the drawing) are arranged on a front side of the backpack 4 as compared to a portion on which the battery packs 50A1, 50A2, 50B1, and 50B2 (50A2 is illustrated in the drawing) are mounted in the blower main body 6.

As illustrated in FIG. 3, since the driving controller 60A is required to be coupled to the battery packs 50A1 and 50A2, this is arranged on a left side of the blower main body 6 when the blower main body 6 is seen from behind the backpack 4. Similarly, since the driving controller 60B is required to be coupled to the battery packs 50B1 and 50B2, this is arranged on a right side of the blower main body 6.

The centralized management controller 40 drives the motors 12A and 12B (and eventually the fans 10A and 10B) via the driving controllers 60A and 60B, respectively. Therefore, the centralized management controller 40 is coupled to the driving controllers 60A and 60B via cables 42A and 42B and connectors 44A and 44B, respectively.

The centralized management controller 40 is required to be coupled to the various SWs 22, 24, and 28 and the display unit 30 of the handle unit 20 provided on the pipe 8 via the cable 32. Therefore, as is the case with the pipe attaching unit 7, the centralized management controller 40 is arranged on the right side when the blower main body 6 is seen from behind the backpack 4.

Specifically, as is the case with the driving controllers 60A and 60B, the centralized management controller 40 is arranged on the front side of the backpack 4 as compared to the portion on which the battery packs 50A1 to 50B2 are mounted. When the blower main body 6 is seen from behind the backpack 4, the centralized management controller 40 is arranged to the right of the driving controller 60B (refer to FIG. 3).

As a result, the cable 42A coupling the centralized management controller 40 to the driving controller 60A can be made longer than the cable 42B coupling the centralized management controller 40 to the driving controller 60B.

In this embodiment, by making the cables 42A and 42B to have different lengths in this manner, wiring mistakes caused when they are made to have the same length are inhibited.

That is, the centralized management controller 40 outputs various signals to the driving controllers 60A and 60B via the cables 42A and 42B, respectively. Specifically, the centralized management controller 40 outputs a main SW signal, speed commands of the motors 12A and 12B, and F/R signals indicating the rotational directions of the motors 12A and 12B taken in from the trigger SW 22 and the dial SW 24.

The centralized management controller 40 takes in driving permission signals for permitting driving of the motors 12A and 12B and remaining capacity lowering signals indicating lowering of remaining capacities of the DC power supplies 50A and 50B from the driving controllers 60A and 60B via the cables 42A and 42B, respectively.

The centralized management controller 40 also takes in power supply voltages VbatA and VbatB of the DC power supplies 50A and 50B (voltages between both ends of the two batteries coupled in series) from the driving controllers 60A and 60B via the cables 42A and 42B.

Therefore, when the driving controllers 60A and 60B are coupled in an opposite manner via the cables 42A and 42B, for example, the F/R signal problematically becomes a command signal for rotating in the direction opposite to the air blowing direction (that is, suction direction).

On the other hand, if the centralized management controller 40 is arranged as described above and the cables 42A and 42B between the same and the driving controllers 60A and 60B are set to have different lengths as in this embodiment, such a problem caused by the wiring mistakes can be inhibited.

Input lines of the power supply voltages VbatA and VbatB of the DC power supplies 50A and 50B from the driving controllers 60A and 60B to the centralized management controller 40 are formed of pairs of positive and negative signal lines coupled to positive electrode sides and negative electrode sides of the DC power supplies 50A and 50B. The signal lines on the negative electrode sides are coupled to ground lines of the centralized management controller 40.

Accordingly, the negative electrode sides of the DC power supplies 50A and 50B have the same electric potential via the centralized management controller 40. As is described later, since ground lines of the driving controllers 60A and 60B are also coupled to the negative electrode sides of the corresponding DC power supplies 50A and 50B, the ground lines of the centralized management controller 40 and the driving controllers 60A and 60B also have the same electric potential.

Configurations of the driving controllers 60A and 60B are next described.

As illustrated in FIG. 5, in the driving controllers 60A and 60B, positive electrode terminals of the battery packs 50A1 and 50B1 are coupled to the power supply lines on the positive electrode side for driving the motors 12A and 12B.

Also, negative electrode terminals of the battery packs 50A2 and 50B2 are coupled to the ground lines on the negative electrode side and the negative electrode terminals of the battery packs 50A1 and 50B1 and the positive electrode terminals of the battery packs 50A2 and 50B2 are coupled in the driving controllers 60A and 60B, respectively.

Each of the driving controllers 60A and 60B is provided with an inverter circuit 62 and a control circuit 70.

The inverter circuit 62 is supplied with electric power from the power supply line and the ground line and energizes windings of each phase of the motors 12A and 12B.

Therefore, the inverter circuit 62 is provided with three switching elements (so-called high-side switches) Q1, Q2, and Q3 provided between the power supply line and connection points of the windings of each phase of the motors 12A and 12B.

Also, the inverter circuit 62 is provided with three switching elements (so-called low-side switches) Q4, Q5, and Q6 provided between the connection points of the windings of each phase of the motors 12A and 12B and the ground line.

The control circuit 70 is configured to control an on/off state of each of the switching elements Q1 to Q6 forming the inverter circuit 62, and is formed of a well-known microcomputer including a CPU, a ROM, a RAM, an input/output port and the like.

In the control circuit 70, the CPU executes various control processes in accordance with a control program stored in the ROM, thereby serving as a rotor position detection unit 72, a rotor rotational speed calculation unit 74, a PWM generation unit 76, and a switching control unit 78.

Herein, the rotor position detection unit 72 detects rotational positions (phases) of the motors 12A and 12B based on detection signals from rotational position sensors 64 provided on the motors 12A and 12B.

The rotor rotational speed calculation unit 74 calculates the rotational speeds of the motors 12A and 12B from changes in the rotation positions detected by the rotor position detection unit 72.

The PWM generation unit 76 generates a gate driving signal (PWM signal) required for driving the motors 12A and 12B at the rotational speeds corresponding to the speed commands based on the speed command signals input from the centralized management controller 40 and the rotational speeds calculated by the rotor rotational speed calculation unit 74. PWM stands for Pulse Width Modulation.

When the main SW signal is input from the centralized management controller 40 to the switching control unit 78, the switching control unit 78 controls the respective switching elements Q1 to Q6 of the inverter circuit 62 based on the PWM signal generated by the PWM generation unit 76, thereby driving the motors 12A and 12B.

Specifically, in accordance with the F/R signals input from the centralized management controller 40, the switching control unit 78 controls the respective switching elements Q1 to Q6 so that rotational directions of the motors 12A and 12B become a positive direction or a negative direction.

Each of the driving controllers 60A and 60B is provided with a state monitoring unit 80.

The state monitoring unit 80 is configured to monitor states of battery state detection units 82 and 84, a temperature sensor 68 that detects temperature of the driving controllers 60A and 60B, a temperature sensor 66 that detects temperature of the motors 12A and 12B and the like based on detection signals therefrom. The battery state detection units 82 and 84 detect the temperature, remaining capacity and the like of the battery packs 50A1 and 50A2 or 50B1 and 50B2.

When determining that the motors 12A and 12B can be normally driven from a monitoring result thereof, the state monitoring unit 80 outputs a driving permission signal to the centralized management controller 40. Otherwise, the state monitoring unit 80 stops the output of the driving permission signal.

When determining that the remaining capacity of the battery packs 50A1 and 50A2 or 50B1 and 50B2 lowers, the state monitoring unit 80 outputs a remaining capacity lowering signal to the centralized management controller 40.

Also, a remaining capacity display unit 52A or 52B illustrated in FIG. 4 is coupled to the state monitoring unit 80, and the state monitoring unit 80 outputs first and second remaining capacity display signals indicating the remaining capacity of the battery packs 50A1 and 50A2 or 50B1 and 50B2 to the remaining capacity display unit 52A or 52B.

As a result, the remaining capacity of the battery packs 50A1 and 50A2 or 50B1 and 50B2 is displayed on the remaining capacity display units 52A or 52B, and the user can check the remaining capacity of the battery packs 50A1 and 50A2 or 50B1 and 50B2 from the display.

The remaining capacity display units 52A and 52B are provided on the blower main body 6.

As described above, in the blower 2 of this embodiment, when the trigger SW 22 provided in the handle unit 20 is operated to turn on the main SW 22a, the centralized management controller 40 sets the rotational speeds of the fans 10A and 10B (in other words, the motors 12A and 12B).

Then, the centralized management controller 40 outputs the speed command signals corresponding to the set rotational speeds to the driving controllers 60A and 60B, thereby rotationally driving the motors 12A and 12B (eventually, the fans 10A and 10B) in the direction where air is blown.

Figure 6:
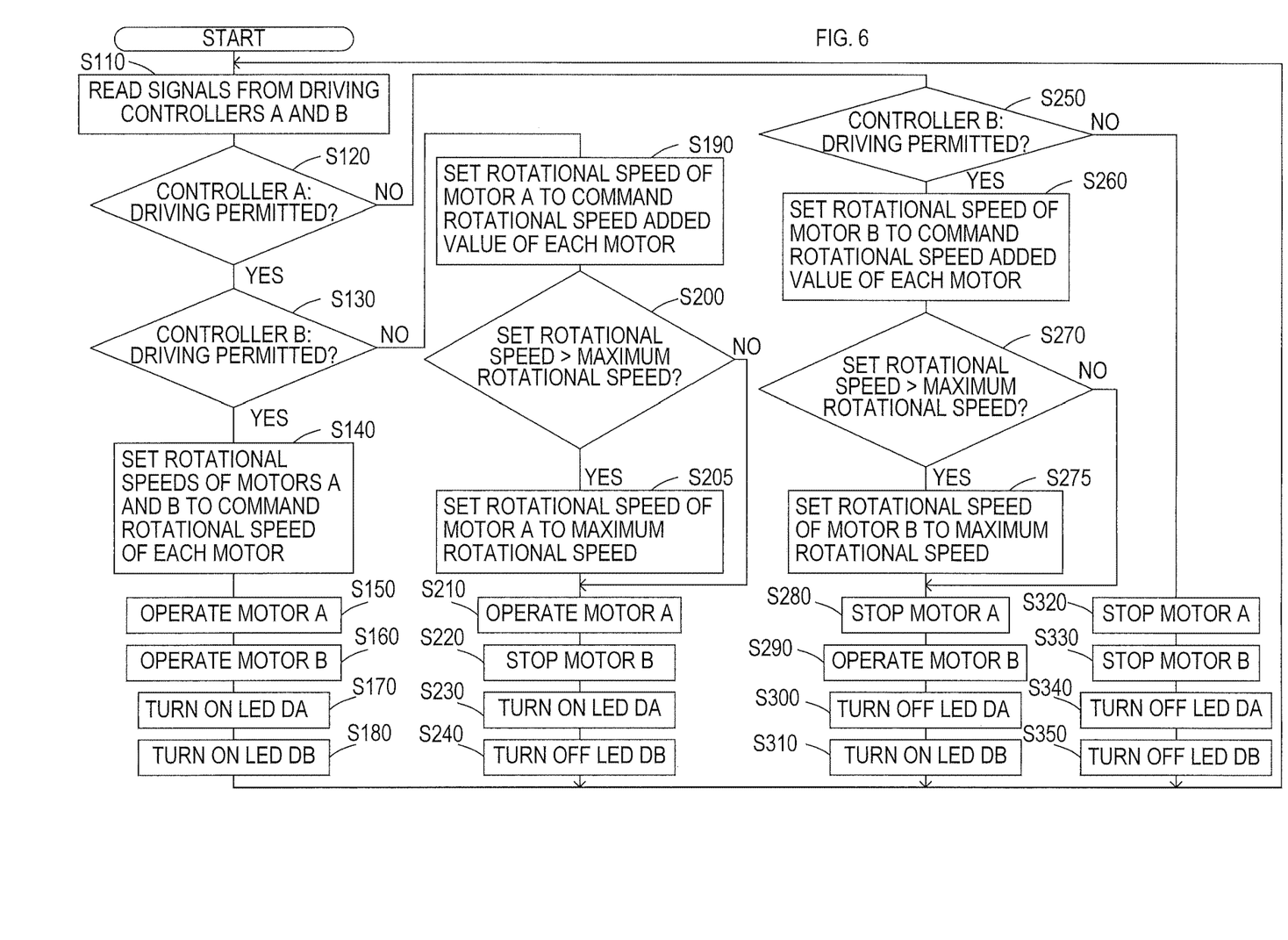
FIG. 6 is a flowchart illustrating a control process executed by a centralized management controller.

Driving control of the motors 12A and 12B by the centralized management controller 40 is executed by a procedure illustrated in FIG. 6.

As illustrated in FIG. 6, at the time of driving control of the motors 12A and 12B, the centralized management controller 40 takes in the driving permission signals from the driving controllers 60A and 60B of the motors 12A and 12B at S110.

At subsequent S120, it is determined whether the driving of the motor 12A is permitted based on the driving permission signal from the driving controller 60A. If the driving is permitted, the procedure shifts to S130, and if the driving is not permitted, the procedure shifts to S250.

Next, at S130, it is determined whether the driving of the motor 12B is permitted based on the driving permission signal from the driving controller 60B. If the driving is permitted, the procedure shifts to S140, and if the driving is not permitted, the procedure shifts to S190.

Since the driving of the motors 12A and 12B is currently permitted at S140, the rotational speeds of the motors 12A and 12B are set to command rotational speeds set based on the trigger shift command from the trigger SW 22 and the dial shift command from the dial SW 24.

At subsequent S150 and S160, the speed command signals corresponding to the rotational speeds set at S140 are output to the driving controllers 60A and 60B, respectively. As a result, the motors 12A and 12B rotate at constant speeds at the command rotational speeds set via the trigger SW 22 and the dial SW 24.

At subsequent S170 and S180, since the motors 12A and 12B are normally driven, the light emitting diodes DA and DB of the display unit 30 are turned on so as to indicate that they are normally driven, and then the procedure shifts to S110 again.

Next, at S190, since the driving of the motor 12B is currently prohibited, the rotational speed of the motor 12A is set to an added value obtained by adding the command rotational speeds set for the respective motors 12A and 12B to each other, and the procedure shifts to S200. The rotational speed of the motor 12B at this time is "0".

At S200, it is determined whether the rotational speed set at S190 exceeds the maximum rotational speed of the motor 12A set in advance. If the set rotational speed does not exceed the maximum rotational speed, the procedure shifts to S210.

The maximum rotational speed used at S200 is not the rotational speed set via the dial SW 24 but the maximum rotational speed at which the driving is permitted according to specifications of the motor 12A.

Next, at S200, if it is determined that the set rotational speed exceeds the maximum rotational speed, the rotational speed of the motor 12A is set to the maximum rotational speed at S205, and then the procedure shifts to S210.

At S210, the speed command signal corresponding to the rotational speed set in the processes at S190 to S205 is output to the driving controller 60A. As a result, the motor 12A rotates at a constant speed at the rotational speed obtained by adding the command rotational speed of the motor 12A and the command rotational speed of the motor 12B set via the trigger SW 22 and the dial SW 24.

At subsequent S220, by stopping the output of the speed command signal to the driving controller 60B or by outputting the speed command signal of "rotational speed: 0" to the driving controller 60B, the driving of the motor 12B is stopped.

At subsequent S230, the light emitting diode DA of the display unit 30 is turned on, and at subsequent S240, the light emitting diode DB of the display unit 30 is turned off. Then, the procedure shifts to S110. As a result, the user can detect by looking at the display unit 30 that there currently is abnormality in a driving system of the fan 10B and only the fan 10A rotates.

When a drive output of the fan 10B is lowered due to the lowering of the remaining capacity of the battery packs 50B1 and 50B2, the centralized management controller 40 detects this by the remaining capacity lowering signal and blinks the light emitting diode DB of the display unit 30.

Therefore, the user can also detect the lowering of the remaining capacity of the battery packs 50B1 and 50B2 by checking the display unit 30.

Next, at S250, similarly to S130, it is determined whether the driving of the motor 12B is permitted based on the driving permission signal from the driving controller 60B, and if the driving is permitted, the procedure shifts to S260.

At S260, since the driving of the motor 12A is currently prohibited and the driving of the motor 12B is currently permitted, the rotational speed of the motor 12B is set to an added value obtained by adding the command rotational speeds set for the respective motors 12A and 12B, and the procedure shifts to S270. The rotational speed of the motor 12A at this time is "0".

At S270, it is determined whether the rotational speed set at S260 exceeds the maximum rotational speed of the motor 12B set in advance. If the set rotational speed does not exceed the maximum rotational speed, the procedure shifts to S280.

The maximum rotational speed used at S270 is the maximum rotational speed at which the driving is permitted according to specifications of the motor 12B, as is the case at S200.

Next, at S270, if it is determined that the set rotational speed exceeds the maximum rotational speed, the rotational speed of the motor 12B is set to the maximum rotational speed at S275, and then the procedure shifts to S280.

At S280, by stopping the output of the speed command signal to the driving controller 60A or by outputting the speed command signal of "rotational speed: 0" to the driving controller 60A, the driving of the motor 12A is stopped.

Then, at subsequent S290, the speed command signal corresponding to the rotational speed set in the processes at S260 to S275 is output to the driving controller 60B. As a result, the motor 12B rotates at a constant speed at the rotational speed obtained by adding the command rotational speed of the motor 12A and the command rotational speed of the motor 12B set via the trigger SW 22 and the dial SW 24.

Next, at subsequent S300, the light emitting diode DA of the display unit 30 is turned off, and at subsequent S310, the light emitting diode DB of the display unit 30 is turned on. Then, the procedure shifts to S110. As a result, the user can detect by looking at the display unit 30 that there currently is abnormality in a driving system of the fan 10A and only the fan 10B rotates.

When the drive output of the fan 10A is lowered due to the lowering of the remaining capacity of the battery packs 50A1 and 50A2, the centralized management controller 40 detects this by the remaining capacity lowering signal and blinks the light emitting diode DA of the display unit 30.

Therefore, the user can also detect the lowering of the remaining capacity of the battery packs 50A1 and 50A2 by checking the display unit 30.

Next, at S250, when it is determined that the driving of the motor 12B is not permitted, driving of both the motors 12A and 12B is prohibited, so that the driving of the motors 12A and 12B is stopped at S320 and S330.

At S320 and S330, by stopping the output of the speed command signals to the driving controllers 60A and 60B or by outputting the speed command signals of "rotational speed: 0" to the driving controllers 60A and 60B, the driving of the motors 12A and 12B is stopped.

At subsequent S340 and S350, since both the motors 12A and 12B are stopped, the light emitting diodes DA and DB of the display unit 30 are turned off so as to indicate this and thereafter the procedure shifts to S110 again.

As described above, the blower 2 of this embodiment is provided with the pair of fans 10A and 10B. The driving controllers 60A and 60B provided for the fans 10A and 10B, respectively, are supplied with electric power from dedicated DC power supplies 50A and 50B to drive the motors 12A and 12B of the fans 10A and 10B, respectively.

Therefore, the air (wind) blown from the blowing port 9 of the pipe 8 is generated by the rotation of the two fans 10A and 10B, and air blowing capability can be increased as compared with a blower in which only one fan and one motor are provided. Also, if the blowing capability is the same, the generation of noise can be inhibited.

As compared with a case where electric power is supplied from a common DC power supply to the fans 10A and 10B (motors 12A and 12B), the power consumption of the batteries forming the DC power supplies 50A and 50B can be reduced. Therefore, usable time (so-called run time) from a fully charged state of the battery can be lengthened.

In this embodiment, the DC power supplies 50A and 50B are coupled to the driving controllers 60A and 60B, respectively, and the driving controllers 60A and 60B individually drive the motors 12A and 12B, respectively.

Therefore, even if the voltages supplied from the DC power supplies 50A and 50B are uneven, current does not flow from one DC power supply to the other DC power supply. Therefore, for example, even if abnormality occurs in the driving system of one of the motors 12A and 12B and the fan thereof stops, the other motor can be driven to operate as the blower 2.

Especially, in this embodiment, when abnormality occurs in the driving system of one motor, the driving controller stops the output of the driving permission signal, thereby notifying the centralized management controller 40 of this.

Then, the centralized management controller 40 sets the rotational speed of the motor that can be normally driven to twice the rotational speed at the normal time with the maximum rotational speed set in advance as an upper limit.

As a result, according to this embodiment, even if an abnormality occurs in the driving system of one motor, the air blowing amount from the blowing port 9 of the blower 2 can be controlled to the blowing amount required by the user by the operation of the trigger SW 22.

Therefore, according to the blower 2 of this embodiment, it is possible to inhibit deterioration of a function as the blower 2 when an abnormality occurs in the driving system of one motor.

Power supply voltages are input to the centralized management controller 40 from the positive electrode sides and the negative electrode sides of the DC power supplies 50A and 50B via the driving controllers 60A and 60B, and the negative electrode sides of the DC power supplies 50A and 50B are coupled to the ground lines of the centralized management controller 40.

Therefore, the electric potential of the ground lines of the centralized management controller 40 and the driving controllers 60A and 60B and the electric potential of the negative electrode sides of the DC power supplies 50A and 50B can be made the same.

Therefore, reference potential of a control system when the centralized management controller 40 drives the motors 12A and 12B via the driving controllers 60A and 60B can be made the same and design work when constructing the control system can be simplified.

In this embodiment, the state monitoring unit 80 in each of the driving controllers 60A and 60B and the centralized management controller 40 correspond to the control unit described above, and the inverter circuit 62 and the control circuit 70 in each of the driving controllers 60A and 60B correspond to the driving unit described above.

Although one embodiment of the present disclosure is described above, the backpack-type blower of the present disclosure is not limited to the above-described embodiment and may take various modes.

For example, in the above-described embodiment, it is described that the rotation position sensor 64 is provided in each of the motors 12A and 12B and the rotor position detection unit 72 detects the rotation position (phase) of each of the motors 12A and 12B based on the detection signal from the rotation position sensor 64.

Figure 7:
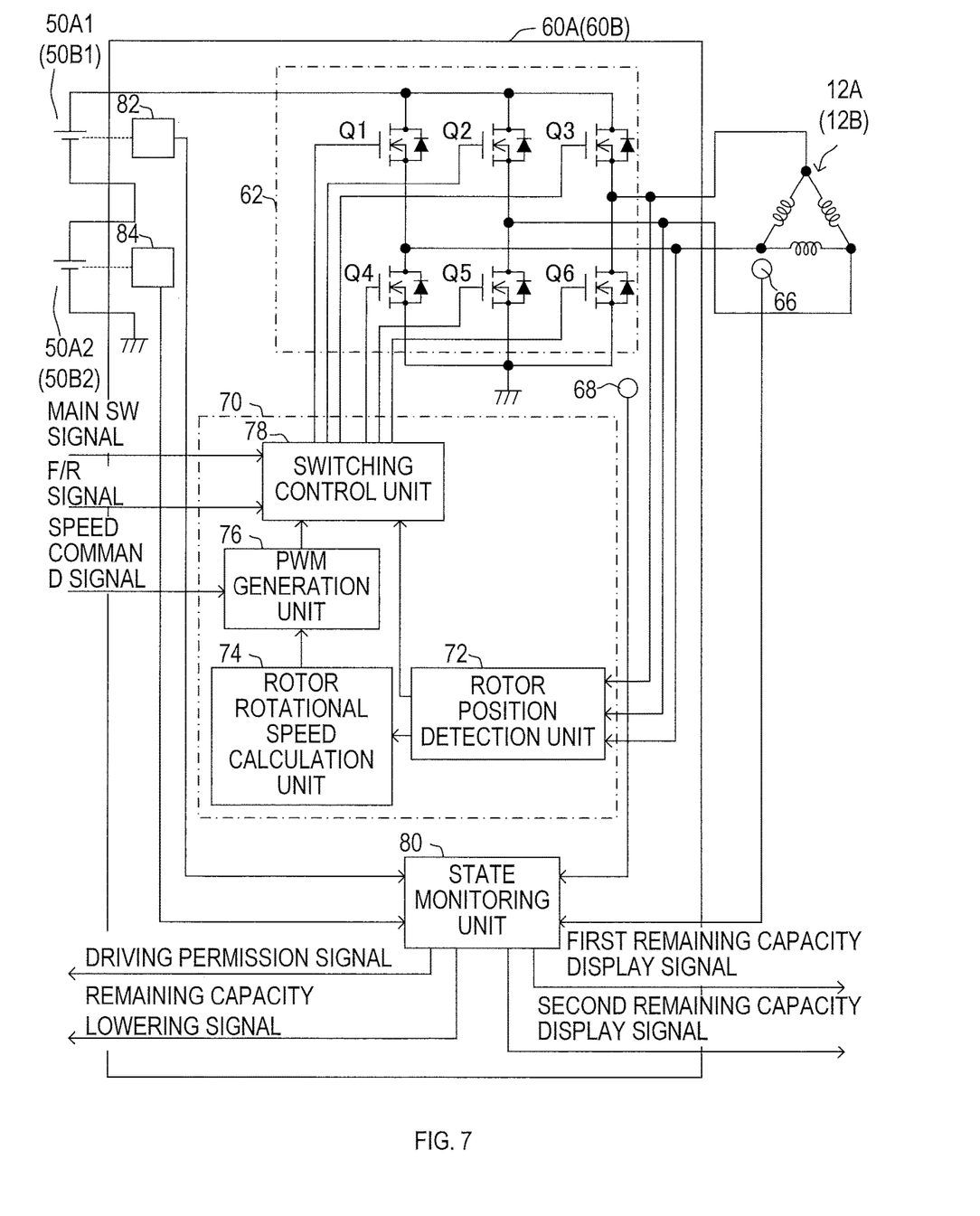
FIG. 7 is a block diagram illustrating a variation of the circuit configuration of the driving controller.

However, as illustrated in FIG. 7, each of the motors 12A and 12B may be a sensorless motor that is not provided with the rotational position sensor 64. In this case, the rotor position detection unit 72 detects the rotational position based on induced voltage generated in a current path from the inverter circuit 62 to the motors 12A and 12B.

This makes it possible to decrease the number of signal lines coupling the motors 12A and 12B and the driving controllers 60A and 60B, thereby making wiring work easy.

In the above-described embodiment, it is described that, when the motors 12A and 12B may be normally driven, the centralized management controller 40 controls the rotational speeds of the motors 12A and 12B to the command rotational speeds set via the trigger SW 22 and the dial SW 24.

Since the DC power supply 50A for driving the motor 12A and the DC power supply 50B for driving the motor 12B are separately charged and discharged, remaining power amounts (that is, remaining capacities) accumulated in the DC power supplies 50A and 50B might be uneven.

Therefore, if the rotational speeds of the motors 12A and 12B are controlled to be the same, unevenness may occur in time during which the motors 12A and 12B can be driven.

Therefore, the state monitoring unit 80 of each of the driving controllers 60A and 60B may notify the centralized management controller 40 of the remaining capacity of each of the DC power supplies 50A and 50B. Then, the centralized management controller 40 sets the command rotational speed for each of the motors 12A and 12B in accordance with difference (ratio or the like) of the notified remaining capacities in the process at S140.

That is, by doing so, the electric power supplied from the DC power supplies 50A and 50B to the motors 12A and 12B, respectively, is controlled such that time until the remaining capacities of the DC power supplies 50A and 50B reach a threshold for determining motor drive is the same.

In this manner, it is possible to efficiently use the electric power of each DC power supply and control the air blowing amount from the blowing port 9 to the blowing amount according to the user's request.

In the above-described embodiment, the DC power supplies 50A and 50B are described to be used for the motors 12A and 12B, respectively.

However, for example, when any one of the motors 12A and 12B (or the fans 10A and 10B) fails and electric power sufficient for driving the motor is accumulated in the DC power supply corresponding to the failed motor, the DC power supply may be used for driving the other motor.

That is, by switching the connection by the centralized management controller 40 or the driving controllers 60A and 60B, the above-described DC power supplies 50A and 50B or the battery packs 50A1 to 50B2 forming the same may be used to drive the other motor 12B or 12A.

Next, in the above-described embodiment, each of the DC power supplies 50A and 50B is described to be formed by coupling the two battery packs 50A1 and 50A2 or 50B1 and 50B2 in series.

However, each of the DC power supplies 50A and 50B may be formed of one battery pack or three or more battery packs. In the case where the DC power supplies 50A and 50B are formed of a plurality of battery packs, the battery packs need not be coupled in series, but may be coupled in parallel.

In the above-described embodiment, the motors 12A and 12B for rotating the fans 10A and 10B are described as the outer rotor-type brushless motor. However, the motors 12A and 12B are not necessarily configured in this manner as long as they are the motors that can rotationally drive the fans 10A and 10B.

In the above-described embodiment, the fans 10A and 10B are described being arranged side by side such that the central axes thereof are coincident with each other, and outside air is introduced from both sides thereof. However, the fans need not be arranged in this manner. For example, the fans may be arranged so that an introducing direction of the outside air is the same direction (for example, behind the user). Also, the number of fans is not necessarily two, and may be three or more.

The invention claimed is:

1. A backpack-type blower, comprising:
  a plurality of motors
  a plurality of fans, each of which is configured to be rotationally driven by a corresponding motor of the plurality of motors;
  a plurality of DC power supplies provided with at least one battery for supplying electric power to the plurality of fans, wherein each of the plurality of DC power supplies is configured to supply electric power to a corresponding fan of the plurality of fans via an independent power supply path;
  a backpack on which the plurality of fans and the plurality of DC power supplies are mounted; and
  a centralized management controller that is configured to monitor temperatures of the plurality of motors and is configured to, when detecting an abnormality that rotation of a first fan of the plurality of fans is not able to be continued due to a temperature of a first motor of the plurality of motors that corresponds to the first fan, stop the rotation of the first fan without stopping rotation of other fans of the plurality of fans, wherein the backpack-type blower is configured to blow air from the plurality of fans together.

2. The backpack-type blower according to claim 1, wherein negative electrodes of the plurality of DC power supplies are at the same electric potential.

3. The backpack-type blower according to claim 1, wherein each of the DC power supplies is provided with a plurality of batteries as the at least one battery.

4. The backpack-type blower according to claim 3, wherein the plurality of batteries forming each of the DC power supplies is coupled in series.

5. The backpack-type blower according to claim 1, wherein the centralized management controller is configured to increase a rotational speed of a second fan of the plurality of fans when the rotation of the first fan is stopped.

6. The backpack-type blower according to claim 5, wherein the centralized management controller is configured to control the rotational speed of the second fan so that a blowing amount from the backpack-type blower is the same as a blowing amount before the rotation of the first fan is stopped.

7. The backpack-type blower according to claim 1, wherein the centralized management controller is configured to control the electric power supplied from each of the DC power supplies to each of the fans according to a remaining capacity indicating a remaining amount of electric power accumulated in each of the DC power supplies.

8. The backpack-type blower according to claim 1, wherein each of the plurality of fans is provided with a brushless motor as the motor.

9. The backpack-type blower according to claim 8, wherein the brushless motor is a sensorless motor that is not provided with a sensor for detecting a rotational position.

10. The backpack-type blower according to claim 1, further comprising:
  a driving unit that is configured to control the plurality of motors such that the plurality of fans constantly rotate when the centralized management controller does not detect the abnormality.

11. The backpack-type blower according to claim 1, wherein each motor of the plurality of fans is an outer rotor motor.

12. A backpack-type blower, comprising:
  a plurality of fans, each of which is provided with a corresponding motor and is configured to be rotationally driven by the corresponding motor;
  a plurality of DC power supplies provided with at least one battery for supplying electric power to the plurality of fans, wherein each of the plurality of DC power supplies is configured to supply electric power to a corresponding fan via an independent power supply path;
  a backpack on which the plurality of fans and the plurality of DC power supplies are mounted; and
  a controller that is configured to monitor states of the plurality of DC power supplies or the plurality of fans and, when detecting an abnormality that rotation of a first fan of the plurality of fans is not able to be continued, stop the rotation of the first fan,
  wherein the backpack-type blower is configured to blow air from the plurality of fans together, and
  wherein the corresponding motors include a first motor and a second motor that have a common rotational axis and face in opposite directions.

13. The backpack-type blower according to claim 1, further comprising:
  a blower main body that is (1) mounted on the backpack and (2) fixed to the backpack via a spring.

14. A backpack-type blower, comprising:
a backpack;
a blower main body mounted on the backpack;
a first motor provided in the blower main body;
a second motor provided in the blower main body, the second motor sharing a common rotational axis with the first motor, and the second motor being arranged to face in an opposite direction with respect to the first motor;
a first fan provided in the blower main body, the first fan being configured to be rotationally driven by the first motor; and
a second fan provided in the blower main body, the second fan being configured to be rotationally driven by the second motor.

15. The backpack-type blower according to claim 12, wherein: the first motor is configured to rotationally drive the first fan; the second motor is configured to rotationally drive a second fan of the plurality of fans; the first fan faces the second fan; and the first motor and the second motor are provided between the first fan and the second fan.

16. The backpack-type blower according to claim 14, wherein:
the first fan faces the second fan; and
the first motor and the second motor are provided between the first fan and the second fan.

17. The backpack-type blower according to claim 14, wherein the first fan and the second fan are supported on the common rotational axis.

18. The backpack-type blower according to claim 1, wherein:
the plurality of motors includes a second motor configured to rotationally drive a second fan of the plurality of fans;
the plurality of DC power supplies include a second DC power supply; and
the backpack-type blower includes:
a first driving controller configured to drive the first motor in accordance with the centralized management controller, the first driving controller being configured to receive a first electric power for driving the first motor from the first DC power supply, but not to receive a second electric power for driving the second motor from the second DC power supply; and
a second driving controller configured to drive the second motor in accordance with the centralized management controller, the second driving controller being configured to receive the second electric power from the second DC power supply, but not to receive the first electric power from the first DC power supply.

19. The backpack-type blower according to claim 18, wherein:
the centralized management controller is configured to monitor a temperature of the first driving controller; and
the centralized management controller is configured to stop the first motor via the first driving controller based on the temperature of the first driving controller.

* * * * *